United States Patent
Woody et al.

(10) Patent No.: US 10,390,030 B2
(45) Date of Patent: Aug. 20, 2019

(54) SYMBOLOGY ENCODING IN VIDEO DATA

(71) Applicant: Raytheon Company, Waltham, MA (US)

(72) Inventors: Carl A. Woody, Waltham, MA (US); Tyler Layne Hook, Waltham, MA (US)

(73) Assignee: Raytheon Company, Waltham, MA (US)

( * ) Notice: Subject to any disclaimer, the term of this patent is extended or adjusted under 35 U.S.C. 154(b) by 105 days.

(21) Appl. No.: 15/455,894

(22) Filed: Mar. 10, 2017

(65) Prior Publication Data

US 2018/0262766 A1    Sep. 13, 2018

(51) Int. Cl.
| | |
|---|---|
| *H04N 19/23* | (2014.01) |
| *H04N 19/46* | (2014.01) |
| *H04N 21/84* | (2011.01) |
| *H04N 19/436* | (2014.01) |
| *H04N 21/234* | (2011.01) |
| *H04N 21/236* | (2011.01) |

(52) U.S. Cl.
CPC .......... *H04N 19/23* (2014.11); *H04N 19/436* (2014.11); *H04N 19/46* (2014.11); *H04N 21/23412* (2013.01); *H04N 21/23418* (2013.01); *H04N 21/23602* (2013.01); *H04N 21/84* (2013.01)

(58) Field of Classification Search
CPC .. H04N 19/23; H04N 21/84; H04N 21/23602; H04N 21/23418; H04N 21/23412; H04N 19/436; H04N 19/46
See application file for complete search history.

(56) References Cited

U.S. PATENT DOCUMENTS

| | | | |
|---|---|---|---|
| 4,179,693 | A  | 12/1979 | Evans et al. |
| 5,785,281 | A  | 7/1998  | Peter et al. |
| 5,878,356 | A  | 3/1999  | Garrot et al. |
| 7,110,457 | B1 | 9/2006  | Chen et al. |
| 8,339,394 | B1 | 12/2012 | Lininger |
| 8,587,659 | B1 | 11/2013 | Socolinsky et al. |
| 9,185,321 | B1 | 11/2015 | Laframboise et al. |

(Continued)

FOREIGN PATENT DOCUMENTS

EP    2053847 A1    4/2009

OTHER PUBLICATIONS

International Search Report and Written Opinion from related PCT Application No. PCT/US2017/051308 dated Nov. 8, 2017.
(Continued)

*Primary Examiner* — Marnie A Matt
(74) *Attorney, Agent, or Firm* — Burns & Levinson, LLP; Joseph M. Maraia

(57) ABSTRACT

A sensor data processing apparatus can be coupled to multiple image sensors of different types. The apparatus encodes symbology metadata in metadata space of image frames and maintains raw data from the sensors in the frames. The symbology metadata identifies a type of symbol that can be overlaid on the frame along with a location in the frame that identifies where the symbol can be overlaid. The apparatus transports the frames including the symbology metadata to an output path without overlaying symbology onto the raw data in the frames. Post processing can be performed to selectively overlay symbology in the image of a corresponding frame based on the symbology metadata.

16 Claims, 13 Drawing Sheets

(56) References Cited

U.S. PATENT DOCUMENTS

| | | |
|---|---|---|
| 9,264,598 B1 | 2/2016 | Baldwin |
| 9,497,457 B1 | 11/2016 | Gupta |
| 2004/0258314 A1 | 12/2004 | Hashimoto |
| 2007/0188653 A1 | 8/2007 | Pollock et al. |
| 2008/0037825 A1 | 2/2008 | Lofgren et al. |
| 2008/0059065 A1 | 3/2008 | Strelow et al. |
| 2008/0060034 A1 | 3/2008 | Egnal et al. |
| 2008/0253685 A1 | 10/2008 | Kuranov et al. |
| 2010/0271488 A1 | 10/2010 | Garcia et al. |
| 2011/0145256 A1 | 6/2011 | Dunkel et al. |
| 2013/0021475 A1 | 1/2013 | Canant et al. |
| 2013/0174209 A1 | 7/2013 | Jung et al. |
| 2014/0146229 A1* | 5/2014 | Hsiao ............... H04N 5/44591 348/441 |
| 2015/0016504 A1* | 1/2015 | Auyeung ............... H04N 19/70 375/240.02 |
| 2015/0042845 A1 | 2/2015 | Zhao |
| 2015/0101002 A1 | 4/2015 | Yamashita |
| 2015/0269258 A1* | 9/2015 | Hunt, Jr. ............ G06K 9/00771 707/770 |
| 2015/0326925 A1* | 11/2015 | Ozkan ............... H04N 21/466 725/36 |
| 2015/0341675 A1* | 11/2015 | Su ............... H04N 19/117 375/240.15 |
| 2017/0127126 A1 | 5/2017 | Strein et al. |
| 2017/0272693 A1* | 9/2017 | Strein ............... H04N 7/083 |
| 2018/0007398 A1* | 1/2018 | Bleidt ............... H04N 21/233 |

OTHER PUBLICATIONS

Jiri Halak et al., "Real-time long-distance transfer of uncompressed 4K video for remote collaboration," Future Generation Computer Systems, vol. 27, No. 7, Jul. 1, 2011, pp. 886-892.

SMPTE ST 425-5:2015 "Image Format and Ancillary Data Mapping for the Quad Link 3 Gb/s Serial Interface," Mar. 26, 2015, XP055420124 (28 pages).

SMPTE 3Gb/s SDI for Transport of 1080p50/60, 3D, UHDTV1 / 4k and Beyond, Dec. 31, 2013, XP055371753 (23 pages).

International Search Report and Written Opinion from related PCT Application No. PCT/US2018/016438 dated Mar. 16, 2018.

Shimizu et al., "A Fast Video Stitching Method for Motion-Compensated Frames in Compressed Video Streams", IEEE Conference Paper, 2006, pp. 173-174.

International Search Report and Written Opinion from related PCT Application No. PCT/US2018/016439 dated Mar. 22, 2018.

International Search Report and Written Opinion from related PCT Application No. PCT/US2018/016436 dated Mar. 14, 2018.

* cited by examiner

SYMBOLOGY ENCODING IN VIDEO DATA

FIELD OF TECHNOLOGY

The present disclosure is in the field of image processing architectures and more particularly in the field of ultra-high definition video processing.

BACKGROUND

Ultra-high definition (UHD) image sensors, which have a large image format and small pixel pitch, are becoming commonly available for use in numerous new products and applications. However, conventional video architectures generally do not support bandwidth and timing requirements of UHD sensors. New video architectures that support the bandwidth and timing requirements of UHD sensors have been developed; however, these new video architectures are generally developed from scratch for particular uses without taking advantage of previously available hardware.

Improvements in UHD sensor technologies vastly exceed bandwidth and transport capabilities of many existing video transport architectures. An extensive infrastructure of existing video hardware that is designed and configured for transporting high definition (HD) video is deployed and installed in equipment throughout the world. This infrastructure generally does not support transport of video data from the UHD video cameras to a display or end-user.

Existing HD video architectures are generally configured for processing streams of video data that conform to one or more standard formats such as the Society of Motion Picture and Television Engineers (SMPTE) standards SMPTE 292M and SMPTE 424M, for example. These standards include a 720p high definition (HDTV) format, in which video data is formatted in frames having 720 horizontal data paths and an aspect ratio of 16:9. The SMPTE 292M standard includes a 720p format which has a resolution of 1280×720 pixels, for example.

A common transmission format for HD video data is 720p60, in which the video data in 720p format is transmitted at 60 frames per second. The SMPTE 424M standard includes a 1080p60 transmission format in which data in 1080p format is transmitted at 60 frames per second. The video data in 1080p format is sometimes referred to as "full HD" and has a resolution of 1920×1080 pixels.

A large number of currently deployed image detection systems are built in conformance with HD video standards, such as the commonly used 720p standard. The 1280×720 pixel frames of a 720p standard system include about 1.5 megapixels per frame. In contrast, UHD image sensors generally output image frames in 5 k×5 k format, which have about 25 million pixels per frame. Therefore, the 1280×720 pixels used in a 720p standard system are not nearly enough to transport the much larger number of pixels generated by an UHD image sensor.

UHD sensors are conventionally used with video architectures that are designed particularly for transporting UHD video data. These new video architectures generally leverage video compression techniques to support UHD bandwidth and timing requirements. Some video architectures that are currently used for transporting UHD video data use parallel encoders or codecs and data compression to transport the UHD video. However, the use of compression makes these video architectures unsuitable for end users who rely on receiving raw sensor data.

The use of legacy hardware for transporting UHD video from next generation cameras is problematic because the legacy hardware generally does not provide sufficient bandwidth. Moreover, replacing existing video architectures with new architectures for transporting UHD video data can be impractical and/or prohibitively expensive for users who have already implemented a large amount of conventional video processing equipment.

Various spatial and temporal video compression techniques have been used to process image data from UHD image sensors for transport over existing HD video architectures. The UHD video data is commonly compressed using compression algorithms that retain enough of the UHD video data to generate visible images and video streams for human viewing, but lose or discard data from the UHD image sensors that may not be needed for human viewable images and video streams.

Other conventional techniques for processing data from UHD sensors generally involve the use of new or proprietary video architectures that have been developed for particular applications of the UHD sensors. These techniques are costly and inefficient because they do not take advantage of widely available HD video architectures that have been deployed throughout the world.

Transporting UHD image data on existing equipment generally involves splitting up the image data into multiple packets or sub-frames. Sorting separate video path packets and stitching together panoramic scenes from multiple frames generally adds processing steps that can prevent real-time display of the image data.

Previous systems and methods for stitching panoramic scenes with multiple frames have involved scene registration and image processing to blend the overlapping image data for stitching together panoramic scenes from multiple frames. Other previously known techniques for stitching panoramic scenes with multiple frames have involved inertial based image registration and geo-location based image registration techniques to fuse imagery together, in which one type of image data is fused on top of the other type of image data.

Various other methods for stitching together panoramic scenes from multiple frames have been performed based on feature registration. These methods generally involve substantial post-processing of image data which increases increase latency. Feature registration techniques are not suitable for stitching together panoramic images of scenes that are not feature rich. Also, disadvantageously, many of the existing scene based registration schemes cannot accurately stitch different/multiple spectral bands.

In many UHD imaging applications, it would be desirable to provide raw data from the UHD sensors to analysts or other users. Other consumers of UHD video data require highly accurate and time aligned symbology overlaid with image data to meet mission requirements. However, inserting symbology into the video stream prior to transport replaces raw image data and destroys certain information that could be useful to an analyst or other consumer of the raw data. Previous systems and methods involve archival tagging and the use of time aligned metadata that does not allow presentation of symbology near real time. However, method that rely on time aligned metadata haves been problematic due to asynchronous video and data pipelines, for example.

SUMMARY

Aspects of the present disclosure include a UHD sensor data processing apparatus and method for efficient and lossless collection and of UHD data. A sensor data processing apparatus according to an aspect of the present disclosure includes a raw UHD data input path coupled to processing circuitry and a plurality of image data output paths coupled in parallel to the processing circuitry. One or more metadata output paths are coupled to the processing circuitry in parallel with the image data output paths.

The processing circuitry is configured to receive the raw UHD data from a UHD sensor, divide the raw UHD data into lossless segments and direct the lossless segments in parallel onto the image data output paths. The processor circuitry is also configured to generate metadata including encoded information that facilitates reconstruction of the raw UHD data from the lossless segments, and direct the metadata onto the metadata output paths.

Improved methods and apparatus for transporting video data from UHD sensors to a display or to an end-user via the current video transport architectures as described herein include pixel packing methods and methods of using multiple physical connections to transmit data in parallel. The methods disclosed herein overcome bandwidth limitations of legacy hardware and enable legacy hardware to transport UHD video data from next generation cameras.

According to an aspect of the present disclosure, video processing is performed to reassemble video image data as mosaic tiles or stitched imagery based on metadata that used to track packet and geo-location information. Very accurate geolocation and inertial space/coordinate data is leveraged to precisely stitch video frames. Back-end video processing can be performed to reassemble the video as mosaic tiles or stitched panoramic imagery based on the location data and inertial data that is included in the metadata.

In an illustrative embodiment, metadata encoding schemes are implemented to incorporate geolocation information and inertial space and coordinate information associated with image pixels into standard KLV metadata packets. According to an aspect of the present disclosure, the information is encoded in VANC/HANC metadata space of video data to facilitate down-stream real-time video stitching. KLV metadata is used to transmit packets which contain geo-location and inertial information, time-aligned with video chips.

Multiple frames at the periphery/edges are stitched together based on geo-location and inertial data. The disclosed techniques increase ground coverage of sensor data by reducing or eliminating overlapping of image data in stitched imagery. An aspect of the present disclosure includes a system and method for non-overlapping reconstruction of a video stream based on very accurate inertial space coordinates of a sensor platform and knowledge of angular coordinates defining the direction the sensor is pointing while imaging.

According to another aspect of the present disclosure, contextually appropriate symbology information can be overlaid onto raw video in data to provide situational awareness for entities viewing the data in real time or near real time while preserving raw video data for efficient post-processing. The symbology information can be encoded as metadata and stored in metadata space of corresponding image frames using custom or proprietary encoding schemes over a KLV standard metadata packets, for example.

The disclosed method of incorporating symbology metadata in metadata space of corresponding frames allows transportation of raw video along with an ability to add time and location sensitive symbology to the video for contextual visualization and situational awareness. Aspects of the present disclosure can provide different contextually appropriate symbology for different consumers of the UHD video stream along with the same raw video data.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION

Figure 1:
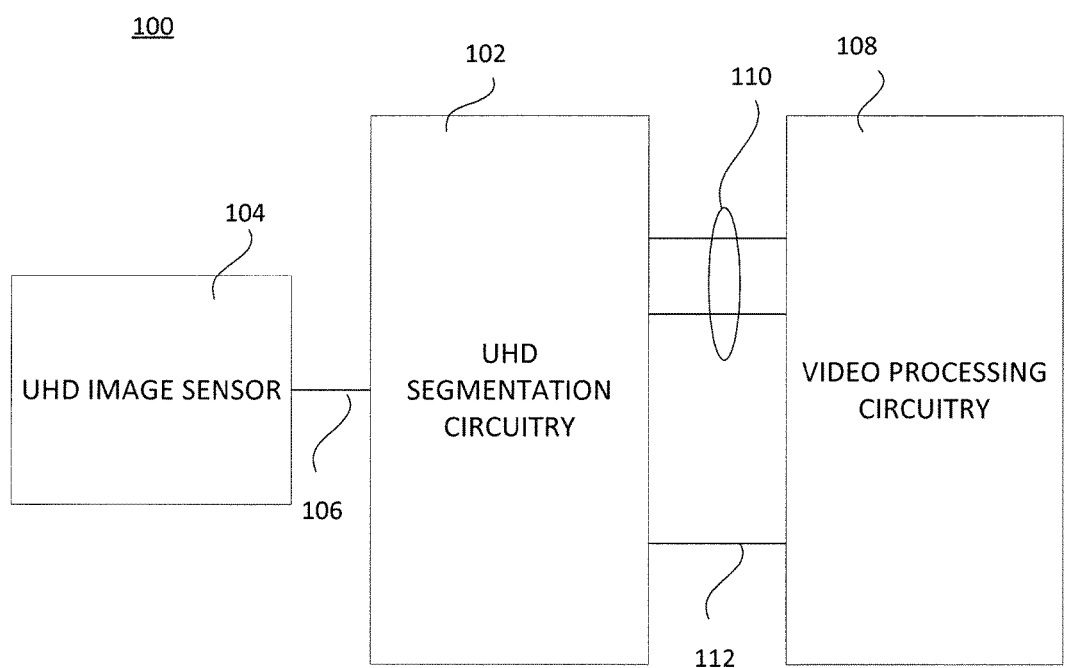
FIG. 1 is a diagram of a UHD sensor data processing system according to an aspect of the present disclosure.

Aspects of the present disclosure include a system and method for lossless communication and processing of UHD video data from one or more UHD image sensors using existing HD video architectures. Processing of UHD video data using currently available video architectures, according to aspects of the present disclosure involves breaking up UHD video data from one or more UHD sensors into manageable segments. The segments are combined and spread into multiple channels of HD video. In an illustrative embodiment, the UHD video data may be provided from a UHD sensor in 5K×5K frames at 30 Hz, which are broken down into 720p60 segments. In the illustrative embodiment, the segments are combined into multiple channels of SMPTE424M 1080p60 video.

Some commonly used UHD image sensors generate image frames having 5120×5120 pixels per frame. However, according to aspects of the present disclosure, "UHD sensor" can refer to a number of different types of image sensors generating different frame sizes and pixel sizes. For example, some UHD image sensors generate image frames having 4K×4K pixels, and may have 12 bits per pixel, or 10 bits per pixel. The term "UHD sensor" as used herein is not limited to a particular type of sensor or a particular frame size or pixel size.

According to another aspect of the present disclosure, the multiple SMPTE feeds are reconstructed into a single UHD video feed based on metadata that describes how the segments were generated from the UHD sensor data.

An illustrative embodiment of the disclosed UHD video processing system and method uses multiple 720p video frame buffers to break apart and encode large format video from one or more UHD image sensors. Image data from the UHD image sensors is spread across a multi-channel 720p HD video architecture. A robust encoding scheme generates metadata that describes how the portions of raw image data are distributed over the multiple channels and enables lossless reconstruction of the original UHD video data.

An illustrative embodiment of a UHD sensor data processing system according to an aspect of the present disclosure is described with reference to FIG. 1. The system 100 includes UHD segmentation circuitry 102 coupled to a UHD image sensor 104 via a raw UHD data input path 106. In the illustrative embodiment, the system 100 also includes video processing circuitry 108 coupled to the UHD segmentation circuitry 102 via a number of image data output paths 110 and one or more metadata paths 112. The data output paths 110 and the metadata paths 112 may coexist on the same conductive pathway or may be alternatively be configured on separate conductive pathways.

In the illustrative embodiment the UHD segmentation circuitry 102 includes memory circuitry coupled to processor circuitry. The processor circuitry is configured to receive raw UHD data from the UHD image sensor 104, divide the raw UHD data into lossless segments and direct the lossless segments in parallel onto the image data output paths 110. In the illustrative embodiment, the processor circuitry is also configured to generate metadata including encoded information that facilitates reconstruction of the raw UHD data from the lossless segments, and to direct the metadata onto the metadata output paths 112.

A method for processing UHD sensor data according to an aspect of the present disclosure is described with reference to FIG. 2. The method 200 includes receiving raw UHD data from a UHD sensor, such as a UHD image sensor 104 of FIG. 1, at block 202 and dividing the raw UHD data into lossless segments at block 204. In an illustrative embodiment the raw UHD data is divided by UHD segmentation circuitry 102 of FIG. 1, which may include a series of FPGA and processing systems, for example. In the illustrative embodiment the UHD segmentation circuitry 102 of FIG. 1 includes digital video processor (DVP) circuitry that receives the video from the UHD image sensor 104 and divides it up into multiple 720p images. The method 200 also includes directing the lossless segments in parallel onto a number of image data output paths, such as the image data output paths 110 of FIG. 1 at block 206. This may also be performed by a series of FPGA and processing systems in the UHD segmentation circuitry 102. The method also includes generating metadata including encoded information that facilitates reconstruction of the raw UHD data from the lossless segments, at block 208, and directing the metadata onto one or more metadata output paths, such as metadata output paths 112 of FIG. 1, in parallel with the image data output paths 110 at block 210.

In an illustrative embodiment, the UHD segmentation circuitry 102 of FIG. 1 includes SMPTE video processor (SVP) circuitry that receives the 720p images from the DVP, circuitry, divides them into appropriately formatted SMPTE 1080p video frames, and adds appropriately formatted SMPTE metadata to ancillary video space. The metadata includes packing details, such as pixel location of start of frame and end of frame, frame rate, bit depth, bit packing mode, etc. The same metadata space has provisions for giving line of sight, or pointing information indicating where the UHD image sensor 104 was pointed for each applicable frame so that this information can be used to add context to the UHD video frame captured by the UHD image sensor 104.

Another illustrative embodiment of an image data processing system according to an aspect of the present disclosure is described with reference to FIG. 3. In the illustrative embodiment, the system 300 includes a UHD image sensor 302 coupled to UHD segmentation circuitry 304. The UHD image sensor 302 is an exemplary implementation of the UHD image sensor 104 shown in FIG. 1. The UHD segmentation circuitry 304 is an exemplary implementation of the UHD segmentation circuitry 102 shown in FIG. 1.

The UHD image sensor 302 generates image frames having a 5 k×5 k pixel format. In this illustrative embodiment, two 720p compatible HD cameras 306, 308 are also coupled to the UHD segmentation circuitry 304. A first one of the 720p compatible cameras is a medium wave infrared camera 306 that generates image frames having a 1280×720 format. A second one of the 720 compatible cameras is a short wave infrared camera 308 that generates image frames having a 1280×720 format.

In the illustrative embodiment, the system 300 is configured to transfer data in compliance with SMPTE standards such as the SMPTE424M standard, for example.

In the illustrative embodiment, the UHD segmentation circuitry 304 includes a video architecture turret 310 coupled to the UHD image sensor 302 and to the 720p compatible HD cameras 306, 308 via a high speed camera interface. The UHD segmentation circuitry 304 also includes a SMPTE video processor 312 coupled to the video architecture turret 310 via a parallel pass through interface such as a slip ring interface 314.

The video architecture turret 310 packs and spreads the UHD image data from the UHD image sensor 302 across six of eight standard 720p parallel output channels as 720p60 Hz video, for example. The video architecture turret 310 also transfers the standard 720p image data from each of the 720p compatible cameras 306, 308 on the respective remaining two of the eight standard 720p parallel output channels as 720p60 Hz video.

The SMPTE video processor 312 receives the eight parallel input channels from the video architecture turret 310 and inserts KLV (Key-Length-Value) metadata using a vertical ancillary (VANC) technique with packing and spreading information to facilitate unpacking and reconstruction of the UHD image data. Persons skilled in the art should recognize that VANC is a conventional technique for embedding non-video information in a video signal. For example, the metadata includes packing details, such as pixel location (row, column) of start of frame and end of frame, frame rate (30, 60), bit depth (8, 10, 12, 16), and bit packing mode (two bytes per pixel, one byte per pixel, etc.), for example. The same metadata space has provisions for giving line of sight (inertial measurement unit (IMU), gyro, accelerometers, resolvers, servo state, encoder feedback, focus information, temperatures of the system optics, etc.) and/or pointing information indicating where the UHD image sensor 302 was pointed for each applicable frame acquired by the UHD image sensor 302. The information in the metadata can be used to add context to the UHD video frame captured by the UHD image sensor 302. The SMPTE video processor 312 also inserts a unique identifier for each image frame.

In the illustrative embodiment, back-end processor circuitry 316 is coupled to the UHD segmentation circuitry 304 to receive the spread and packed UHD image data from the video architecture turret 310 along with the KLV metadata from the SMPTE video processor 312. The back end processing circuitry 316 is an exemplary implementation of the video processing circuitry 108 shown in FIG. 1 and includes a number of outputs. For example, outputs of the back end processing circuitry 316 could be compressed/processed video to display on a standard video display, or could be track data showing tracks of moving objects, etc. The back-end processor circuitry 316 reads the KLV metadata and performs lossless reconstruction of the UHD image data from the UHD image sensor 302 to generate and buffer full frames of UHD video. The back-end processor circuitry 316 may also be configured to identify targets and create tracking information from the buffered UHD video, for example.

Figure 3:
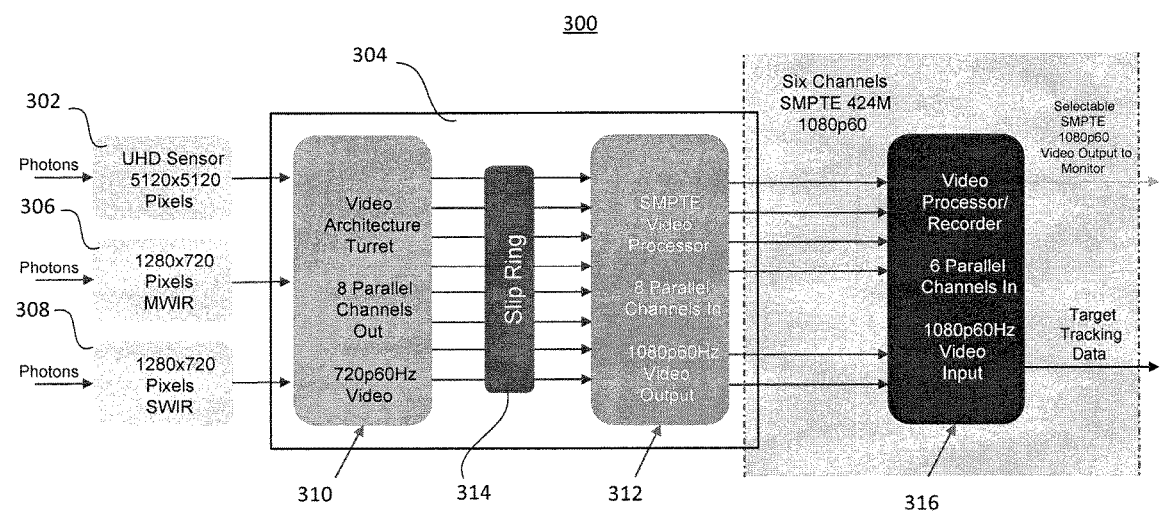
FIG. 3 is a diagram of an illustrative embodiment of a UHD sensor data processing system.
Figure 4:
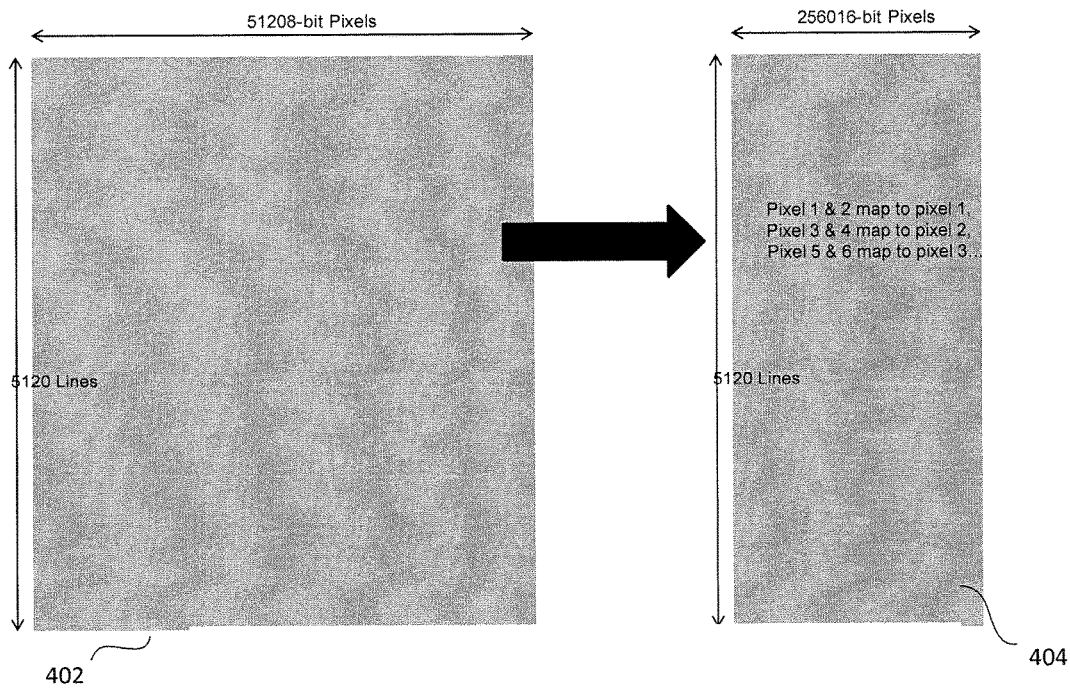
FIG. 4 is a diagram of a UHD image frame in 8 bit pixel format being packed into an image frame having 16 bit pixel format according to an aspect of the present disclosure.

Referring to FIG. 4, in an illustrative embodiment a UHD image frame 402 in a 5120×5120 8 bit pixel format is packed into 5120×2560 16 bit pixel frames 404 by mapping data from every two 8 bit pixels in each of the UHD image frames 402 into a single 16 bit pixel of a corresponding 5120×2560 16 bit pixel frame 404. This may be performed, for example, by the video architecture turret 310 of FIG. 3 to reduce the bandwidth required across the slip ring interface 314 of FIG. 3, by utilizing the existing 16 bit pixel video architecture. This effectively cuts the bandwidth need by half. Alternatively, this packing may be performed by the SMPTE video processor 312. However, packaging the pixels by the video architecture turret 310 prior to the slip ring interface 314 helps to mitigate data bottlenecks that may occur at the slip ring interface 314 prior to the SMPTE video processor 312.

Figure 2:
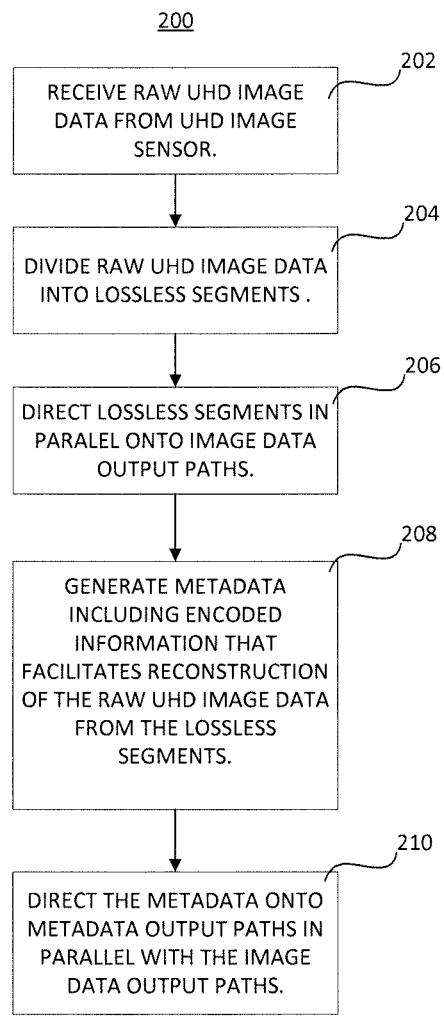
FIG. 2 is a process flow diagram showing a method for processing UHD sensor data according to an aspect of the present disclosure.
Figure 5:
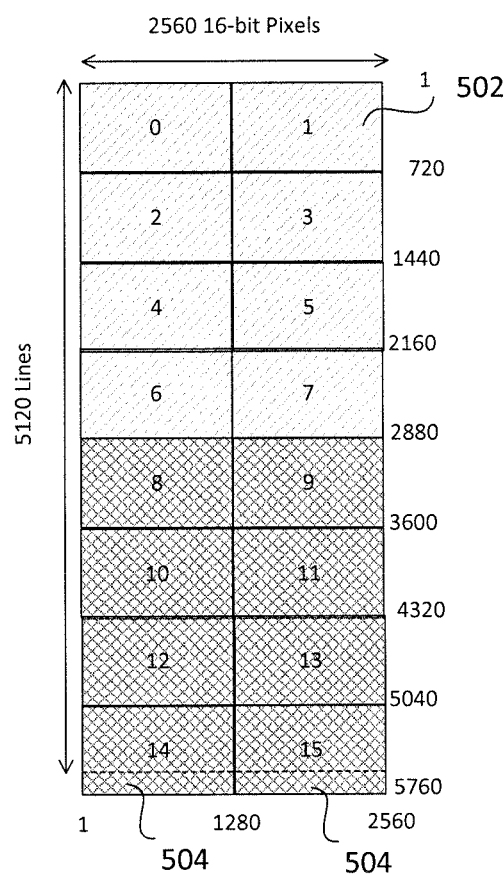
FIG. 5 is a diagram of a UHD image data segmented into 1280×720 pixel frames according to an aspect of the present disclosure.

Referring to FIG. 5, in the illustrative embodiment, each 25 mega-pixels of raw image data contained in the 5120×5120 image frames is divided into lossless segments as described at block 204 of FIG. 2. The 5120×5120 frames are converted for compatibility with a 720 video architecture by dividing the 5120×5210 frames at 8-bits per image into 1280×720 frames with 16 bits per pixel. This results in sixteen 1280×720 frames 502 with 16 bit pixels. According to an aspect of the present disclosure, frames 0-7 are transported by the video architecture turret 310 across the slip ring 314 to the SMPTE video processor 312 (each shown in FIG. 3) in parallel on a first 60 Hz clock cycle, and frames 8-15 are transported across the slip ring interface 314 in parallel on the second 60 Hz clock cycle. Each eight frames of the 1280×720 60 Hz frames 502 are stored in a SMPTE video processor frame memory which is included in the SMPTE video processor 312. In this illustrative embodiment the SMPTE video processor frame memory has excess memory space 504 that can be used for additional data transfer as applicable, every 30 Hz cycle, for example. The KLV metadata is then updated by the SMPTE video processor 312 with applicable packing and spreading information such as pixel location (row, column) of start of frame and end of frame, frame rate (30 Hz, 60 Hz), bit depth (8, 10, 12, 16), and bit packing mode (two bytes per pixel, one byte per pixel, etc.), for example. Unique frame identification (ID), precision timestamp (seconds, fractional seconds all correlated to UTC time) reception of photons on the image sensor, etc. The same metadata space has provisions for giving line of sight (IMU, gyro, accelerometers, resolvers, servo state, encoder feedback, focus information, temperatures of the system optics, etc.) or pointing information of where the UHD image sensor 302 was pointed for each applicable frame, so that this information can be used to add context to the UHD video frame captured by the UHD image sensor 302. The metadata also includes a unique identifier for each frame to generate and output four channels of 1920×1080 60 Hz frames with 20 bit per pixel in SMPTE242M video including the KLV metadata.

The amount of memory space 504 can be observed by considering that the eight parallel 720p channels of 1280×720 frames use about 7.37 million pixels. Because the 720p frames are running at 60 frames per second or 16.667 milliseconds per frame, which is twice as fast as the UHD sensor, the 7.37 million pixels are doubled resulting in about 14.75 million pixels. The 5120×5120 pixel UHD sensor (303, FIG. 3) runs at 30 frames per second or 33.333 milliseconds per frame. Because two 8-bit pixels are packed into each 720p 16-bit pixel, each frame is reduced to an effective 2560×5120 pixel size. This results in about 13.1 million pixels per UHD frame. For every 30 Hz UHD frame (33.333 ms) there are 16 720p frames available to pack UHD sensor data. Therefore, about 14.75 million pixels are available in which to pack about 13.1 million UHD pixels every 33.33 ms or at a 30 Hz rate. In this illustrative embodiment, the excess memory space 504 available in every 30 Hz UHD frame is the difference between 14.75 million and 13.1 million which equals about 1.65 million pixels.

Reassembly and loss of video data in real time for visualization becomes problematic using existing compression techniques. Many existing commercially available architectures for transporting UHD video data employ temporal compression, which destroys metadata accuracy and integrity, destroys alignment of the metadata to video frames, reduces resolution and/or adds undesired latencies. Many techniques for transporting UHD video data are optimized to preserve frame rate and maintain visual appeal of displayed video. These types of architectures are unsuitable for transporting UHD video data in many applications such as surveillance wherein data accuracy and integrity of all metadata is more important than frame rate. In these applications it is important to reconstruct raw video data from the UHD video image sensor.

Aspects of the present disclosure use existing HD video architectures to encode variable pixel count source data across multiple video channels using KLV metadata. The variable pixel count source data may include 2 MP source data and 25 MP source data, for example.

Previously known techniques for stitching frames together involved substantial image processing to identify features for registering and aligning different frames. These techniques are not suitable for stitching substantially featureless frames such as frames in video data that includes large areas of ocean or desert, for example. The previously known techniques also generally involve re-sampling image data and overlapping some portions of the frames. This reduces the available information provided by the sensor system and increased latency due to post-processing delays.

Airframes and other UHD sensor platforms often have access to very accurate position information such as global positioning system (GPS) information, line of sight (LOS) information, inertial guidance information and other sensor pointing information, for example. Knowledge of the position information and area covered by each pixel allows computation of the precise geographical position of areas covered by each pixel in each UHD image frame. According to an aspect of the present disclosure, available positioning and/or pointing information is leveraged in a video processing system and method for stitching together frames that avoids resampling and overlapping of frames and reduce latency. The size of target areas covered by each pixel is also generally known or accessible in airframes and other UHD sensor platforms.

In an illustrative embodiment, geolocation information such as GPS information, LOS information, inertial guidance information and/or other sensor pointing information is encoded in metadata that is transported along with associated video frames. The metadata identifies precise ground positions of certain pixels in the corresponding frame, such as pixels at corners and/or edges of the frame. According to an aspect of the present disclosure, substantially real time processing of the video data aligns frames edge to edge based on the metadata in the frames that provide geolocation of pixels in the frame.

In systems which do not have access to very precise pointing information or position information for each pixel, the disclosed system and method can encode other less precise geolocation information in metadata for pixels or UHD frames. According to another aspect of the present disclosure, the less precise geolocation information and/or pointing information can be used to identify narrower regions of the image data for post-processing to stitch frames together. This substantially reduces post-processing time compared to the post processing of image data covering large areas using traditional frame stitching techniques.

Figure 6:
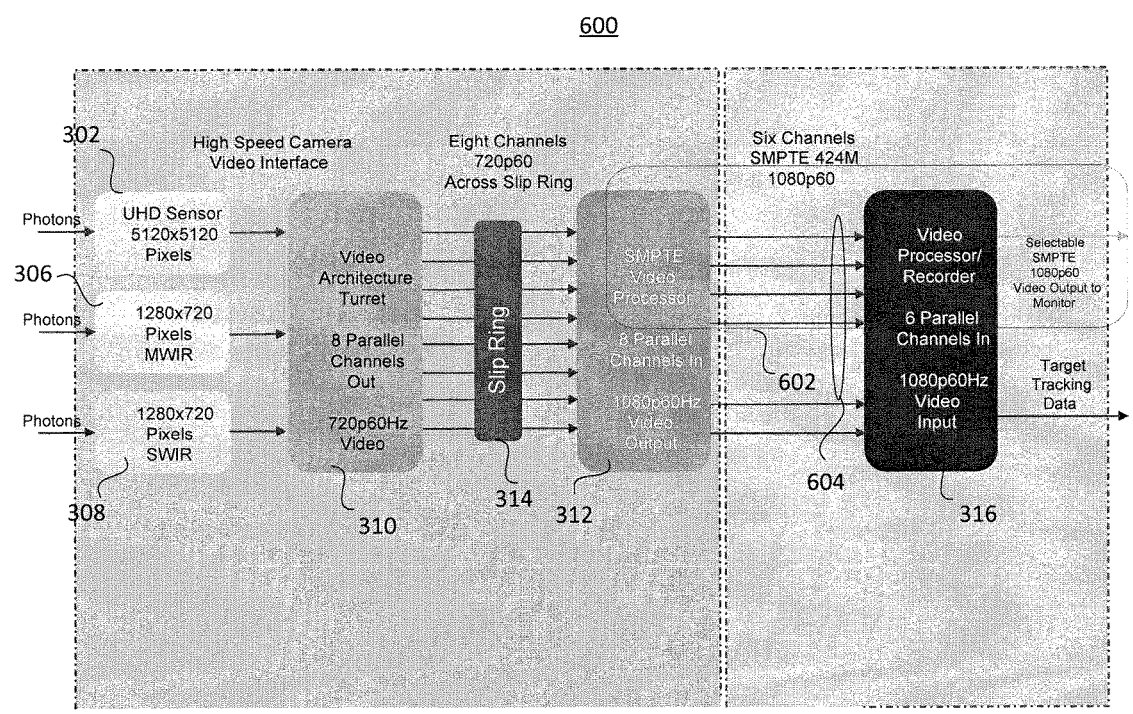
FIG. 6 is a diagram of an illustrative embodiment of a UHD sensor data processing system including a frame stitching module according to an aspect of the present disclosure.

FIG. 6 is a diagram of an illustrative embodiment of sensor data processing apparatus 600 including a frame stitching module 602 according to an aspect of the present disclosure. In the illustrative embodiment, the sensor data processing apparatus 600 performs dynamic scaling, unpacking and assembling of UHD video using multiple SMPTE 424M feeds.

The frame stitching module 602 is coupled to paths between the video processor 312 and back end processor 316, which were described above with reference to FIG. 3. The frame stitching module 602 is configured to use geolocation information such as LOS information and/or GPS information to perform geo-location an inertial space frame stitching to generate panoramic visuals of an imaged area in real-time.

According to aspects of the present disclosure, the sensor data processing apparatus dynamically divides large images received from image sensors 302, 306, 308 and spreads the divided images across a series of 3 Gbps SMPTE standard video transport paths 604. The frame stitching module 602 encodes KLV metadata, LOS information and GPS information associated with frames and/or pixels of the images. The KLV metadata is used to perform geo-location and inertial space frame stitching of adjacent frames to regenerate the larger images.

According to another aspect of the present disclosure the back end processor 316 receives the divided image data along with the KLV metadata over a number of video transport paths 604. In an illustrative embodiment, the video transport paths 604 include six SMPTE 424M 1080p60 channels. The back end processor 316 is configured to read geolocation information associated with frames or pixels in the KLV metadata and to regenerate full UHD images based on the geolocation information in the KLV metadata. In an illustrative embodiment, the back end processor 316 reads the KLV metadata to communicate with the dynamic frame stitching module 602, and ensures that the KLV metadata is time aligned with the appropriate image data.

According to an aspect of the present disclosure, a sensor data processing apparatus includes processing circuitry, a raw UHD video data input path coupled to the processing circuitry, and a number of image data output paths coupled in parallel to the processing circuitry. The sensor data processing apparatus also includes one or more metadata output paths coupled to the processing circuitry in parallel with the image data output paths, and a frame stitching module coupled to the image data output paths. According to an aspect of the present disclosure, the frame stitching module is configured to determine a first geographical position corresponding to an area represented by a first pixel of an edge or corner of a first frame of a video data stream, encode the first geographical position to generate geolocation metadata associated with the first pixel, and incorporate the geolocation metadata associated with the first pixel in a metadata space of the first frame.

According to an aspect of the present disclosure, the frame stitching module is also configured to determine a second geographical position corresponding to an area represented by a second pixel of an edge or corner of a second frame of the video data stream, to encode the second geographical position to generate geolocation metadata associated with the second pixel, and to incorporate the geolocation metadata associated with the second pixel in a metadata space of the second frame. The frame stitching module is configured to align the first frame with the second frame to generate an image including the first frame and the second frame.

In an illustrative embodiment, the frame stitching module is configured to compare the geolocation metadata associated with the first pixel and the geolocation information associated with the second pixel to determine a location of the first geographical position relative to the second geographical position, and to align the edge or corner of the first frame with the edge or corner of the second frame based on the location of the first geographical position relative to the second geographical position to generate an image including the first frame and the second frame. According to an aspect of the present disclosure, the frame stitching module is configured to align the first frame with the second frame in real time without resampling the first frame or the second frame.

Figure 7:
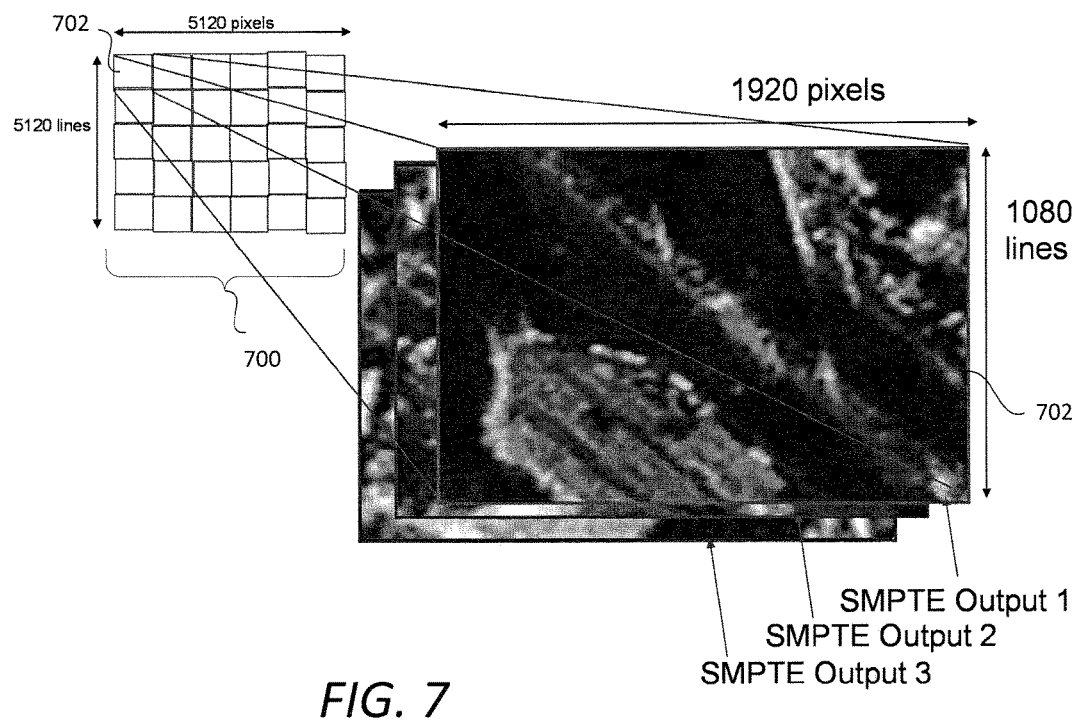
FIG. 7 is diagram of multiple frames of an image associated with metadata for aligning image frames according to an aspect of the present disclosure.

FIG. 7 shows an example use of KVL metadata in an illustrative embodiment. In the illustrative embodiment, an image 700 having 5120 pixels×5120 lines is broken up into a number of 1920×1080p 60 Hz frames 702. Each of the 1920×1080p 60 Hz frames 702 contains a chip of a larger image 700. According to an aspect of the present disclosure, KLV metadata is associated with each of the frames 702. The KVL metadata contains data indicating where the chip is to be located when it is reassembled in the larger image. According to an aspect of the present disclosure, the KLV metadata also contains geo-location information such as line of sight (LOS) information and global positioning system) GPS information that can be used for stitching edges of adjacent frames together to generate mosaics or panoramic images without overlapping pixels.

Figure 8:
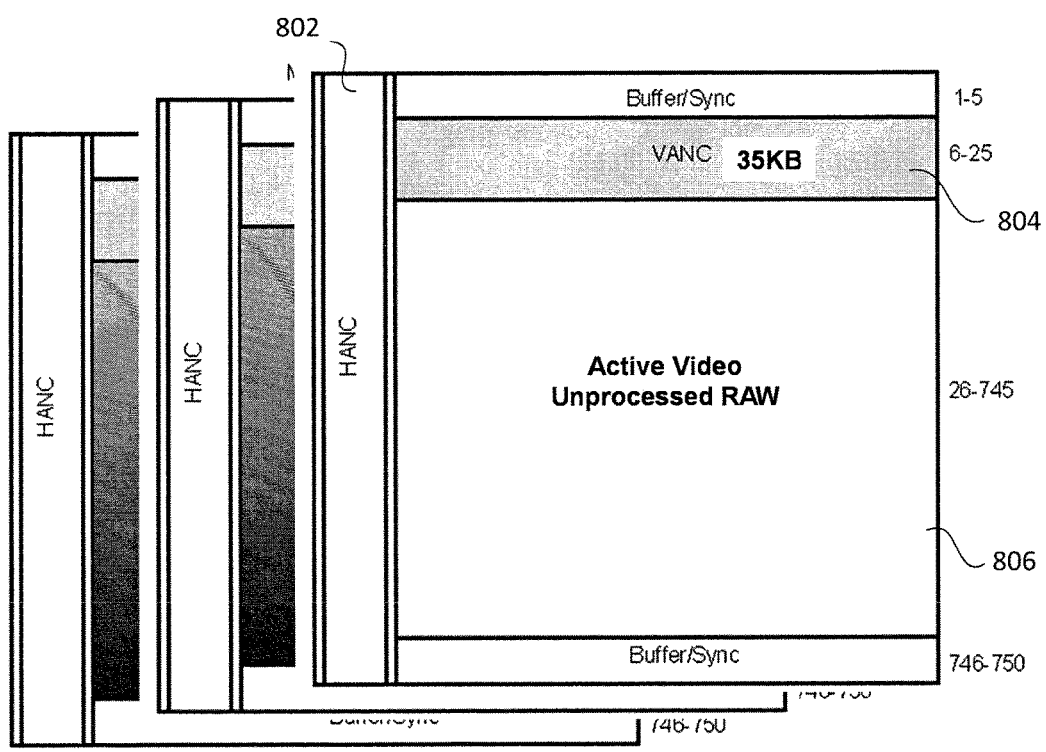
FIG. 8 is diagram of a video stream each include metadata space for storing and transporting metadata describing a method for according to aspects of the present disclosure.

Referring to FIG. 8, parallel video streams each include their own horizontal ancillary (HANC) metadata space 802 and VANC metadata space 804. According to an aspect of the present disclosure, unique time aligned packing and spreading information is included in each VANC metadata space 804 for each frame 806. Encoded information in each VANC metadata space 804 may include unique frame identifiers such as time zone correlated time stamps; start and/or stop pixel location of image(s); line length and number of data paths of the image(s) contained in the frame; pixel packing information; and frame rate information, for example. According to an aspect of the present disclosure, the VANC may also include line of sight (LOS) and pointing information, and/or global positioning system information that precisely indicates a location of the airframe or other sensor platform, for example.

Figure 9:
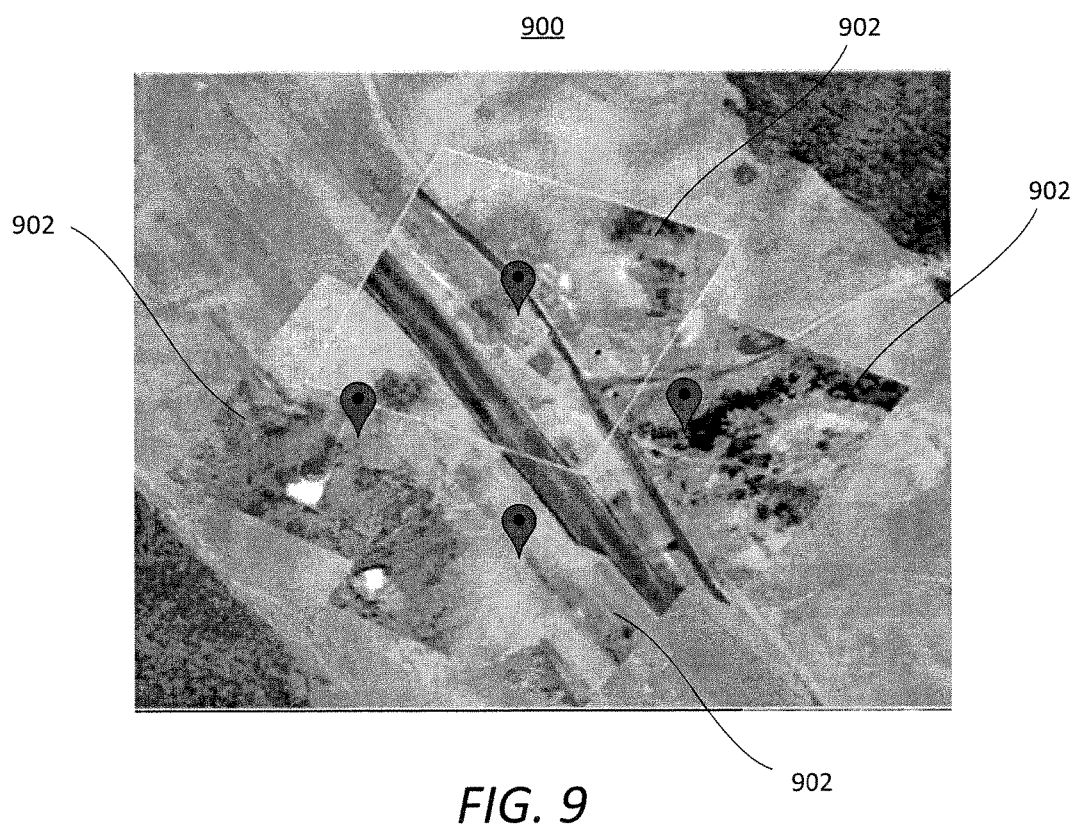
FIG. 9 is diagram showing a panoramic image generated by stitching a number of frames together in real time according to an aspect of the present disclosure.

FIG. 9 illustrates a panoramic image 900 generated by stitching a number of frames 902 together in real time using based on geo-location information that is transported along with the frames in metadata according to an aspect of the present disclosure. In an illustrative embodiment, the disclosed sensor data processing apparatus 600 of FIG. 6 uses precise line of sight information that is generally already available in a sensor platform, and/or precise GPS location of an airframe or other sensor platform to generate the panoramic image. According to an aspect of the present disclosure, the geolocation information such as the LOS information and/or the GPS information is stored in metadata that is transported along with the frames. Based on the precise geolocation information, the frames can be stitched together at edges without having to resample the images. Because the disclosed technique does not rely on feature matching registration techniques, latency is substantially reduced allowing generation of panoramic images in near-real time.

Figure 10:
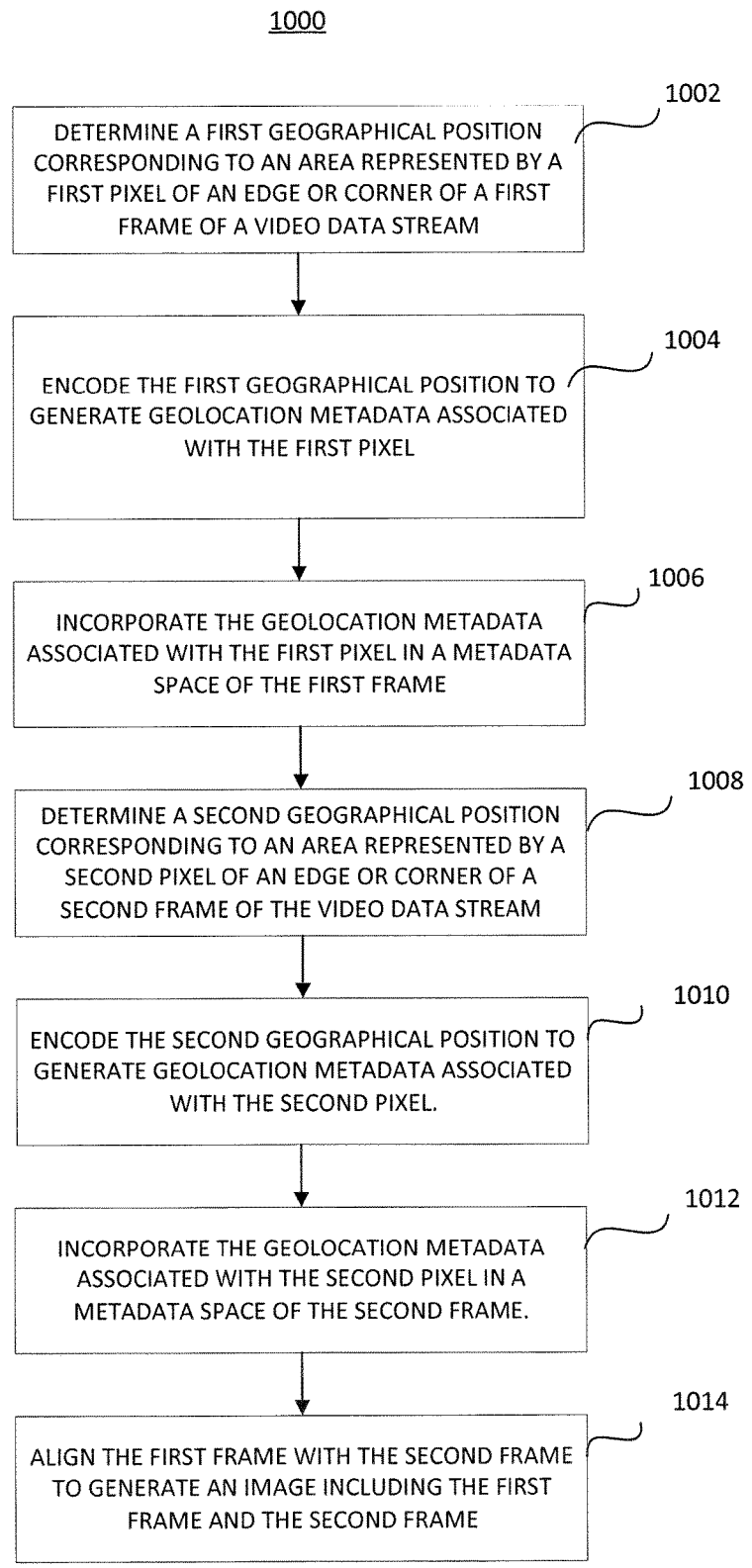
FIG. 10 is a process flow diagram showing a method for aligning frames in video data according to an aspect of the present disclosure.

FIG. 10 is a process flow diagram showing a method 1000 for aligning frames in video data according to an aspect of the present disclosure. At block 1002, the method includes determining a first geographical position corresponding to an area represented by a first pixel of an edge or corner of a first frame of a video data stream. According to an aspect of the present disclosure determining the first geographic position may be determined based on geolocation information such as GPS information, LOS information, inertial guidance information and/or sensor pointing information, for example.

At block 1004, the method includes encoding the first geographical position to generate geolocation metadata associated with the first pixel. At block 1006, the method includes incorporating the geolocation metadata associated with the first pixel in a metadata space of the first frame. At block 1008, the method includes determining a second geographical position corresponding to an area represented by a second pixel of an edge or corner of a second frame of the video data stream. At block 1010, the method includes encoding the second geographical position to generate geolocation metadata associated with the second pixel. At block 1012, the method includes incorporating the geolocation metadata associated with the second pixel in a metadata space of the second frame. The steps of determining 1002, 1008 and encoding 1004, 1010 the geographical positions of frames and pixels and incorporating 1006, 1012 the encoded geolocation information in metadata can be performed by the frame stitching module 602 of FIG. 6, for example.

According to an aspect of the present disclosure, the first geographical position and the second geographical position may be determined based on a size of a target area covered by the first pixel, global positioning system location data of a video sensor generating the video stream, and/or pointing information of a video sensor generating the video stream, for example.

According to an aspect of the present disclosure, the method 1000 also includes transporting the geolocation metadata associated with the first pixel from the frames stitching module 602 to a back end processor 316, of FIG. 3 along with the first frame in the video stream. In an illustrative embodiment, the method 1000 may include incorporating the geolocation metadata associated with the first pixel in a HANC metadata space or a VANC metadata space of the first frame.

At block 1014, the method includes aligning the first frame with the second frame to generate an image including the first frame and the second frame. According to an aspect of the present disclosure, the first frame is aligned with the second frame in real time without resampling the first frame or the second frame. Alignment of the first frame and the second frame can be performed without performing feature registration based on imaged features represented in the first frame and/or the second frame and without overlapping pixels in the first frame with pixels in the second frame.

In an illustrative embodiment the step of aligning the first frame with the second frame can be performed by the back end processor 316, for example. The aligning may be performed by comparing the geolocation metadata associated with the first pixel and the geolocation information associated with the second pixel to determine a location of the first geographical position relative to the second geographical position, and aligning the edge or corner of the first frame with the edge or corner of the second frame based on the location of the first geographical position relative to the second geographical position to generate an image including the first frame and the second frame.

A method for aligning frames in video data, according to another aspect of the present disclosure may include determining a first geographical position corresponding to an area represented by a frame of a video data stream, encoding the first geographical position to generate geolocation metadata associated with the first frame, and incorporating the geolocation metadata associated with the first in a metadata space of the first frame. In this embodiment, the method may also include determining a second geographical position corresponding to an area represented by a second frame of the video data stream, encoding the second geographical position to generate geolocation metadata associated with the second frame and incorporating the geolocation metadata associated with the second pixel in a metadata space of the second frame. The first frame can then be aligned with the second frame based on the geolocation metadata to generate an image including the first frame and the second frame.

Geolocation metadata associated with the first frame is compared with the geolocation information associated with the second frame to determine a location of the first geographical position relative to the second geographical position. The first frame is then aligned with the second frame based on the location of the first geographical position relative to the second geographical position to generate an image including the first frame and the second frame. In an illustrative embodiment, according to this aspect of the present disclosure the first frame and the second frame may be aligned by performing feature registration based on imaged features represented in the first frame and the second frame, for example.

Figure 11:
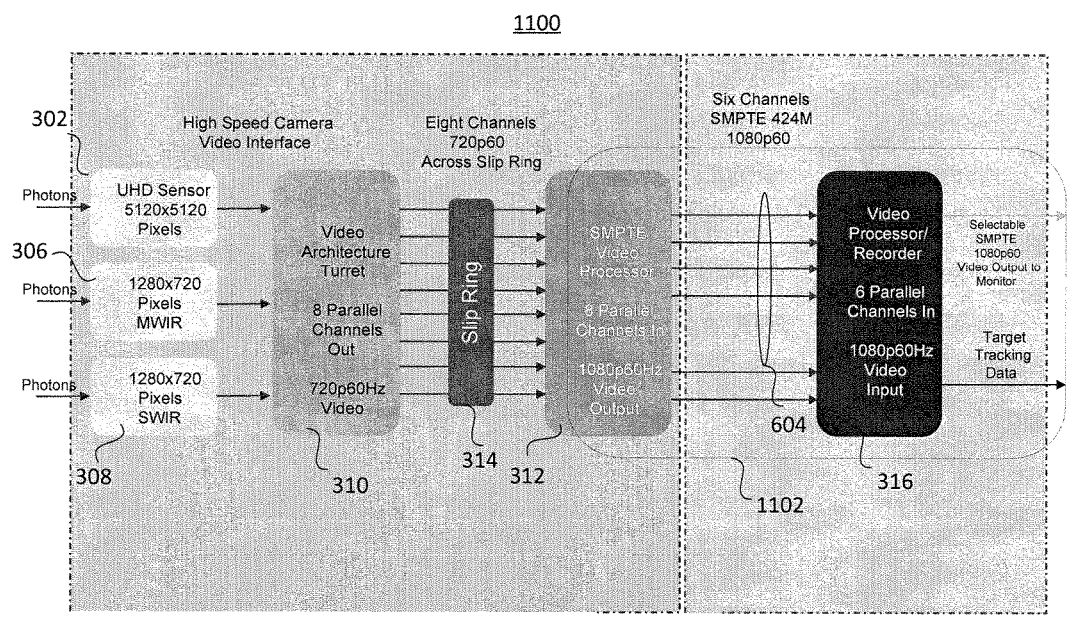
FIG. 11 is a diagram of an illustrative embodiment of a UHD sensor data processing system including a symbology processing module or incorporating symbology information in metadata space of image frames according to an aspect of the present disclosure.

A sensor data processing apparatus 1100 that performs dynamic scaling, unpacking and assembling UI-ID video including raw sensor data separately from symbology information according to another aspect of the present disclosure is described with reference to FIG. 11.

In an illustrative embodiment, the sensor data processing apparatus includes a symbology processing module 1102 coupled to paths between the video processor 312 and back end processor 316, which were described above with reference to FIG. 3. According to aspects of the present disclosure, the dynamic video spreading breaks up large images and spreads them across a series of 3 Gbps SMPTE standard video transport paths 604. In an illustrative embodiment, the video transport paths 604 comprise six SMPTE 424M 1080p60 channels. According to another aspect of the present disclosure the back end processor 316 reads KLV metadata and uses KLV Metadata information to unpack, buffer full frames of UHD video from multiple HD video inputs. The back end processor 316 uses the KLV metadata and user defined fields to communicate with the dynamic video spreading function, and ensures that the metadata is time aligned with the applicable video.

In an illustrative embodiment, the symbology processing module 1102 is configured to embed symbology in metadata in association with corresponding frames of raw video data. The symbology processing module 1102 is configured to acquire a video stream including a video frame from one or more of the image sensors 302, 306, 308 and to identify symbology information associated with the video frame. The symbology processing module 1102 is configured to encode the symbology information in symbology metadata associated with the video frame, and to incorporate the symbology metadata in a metadata space of the video frame.

Image data and video data that is acquired and output from various UHD sensors may be provided to various entities that analyze and process the data for different purposes using a variety of different techniques.

Some of these entities including various analysis, for example, rely on receiving image data and/or video data in a raw form in which it has not been corrupted or altered by compression techniques, addition of symbology, or other post processing. Other entities that receive image and video data including pilots and weapons operators, for example, rely various symbology that is displayed along with the image data. Symbology displayed along with a video data stream from a UHD sensor platform can include cross hairs, location information, target identifiers, aiming and pointing information, platform attitude information, platform velocity etc. Traditionally symbology is overlaid in frames of a video stream.

Traditional video processing systems that add symbology to image data and video data generally overwrite the raw data or overwrite data that has been compressed and/or decompressed, for example. The compression techniques and the addition of symbology each alter the raw data and destroy information that might otherwise have been accessible by processing the raw data.

According to an aspect of the present disclosure, symbology information is included along with standard metadata for each video frame rather than being overlaid on the image data in the frame. In an illustrative embodiment, for each symbol to be displayed in an image or video stream, the symbology information defines a symbol to be displayed and a location in the image defining where the symbol will be displayed. According to an aspect of the present disclosure, the image data and/or raw video data can be provided in an uncompressed and uncorrupted form while the symbology information for each frame can be accessed from the metadata as needed by post processing to overlay desired symbology onto the corresponding frames. The raw data preserves all sensed information from one or more UHD sensors for further analysis, while the symbology metadata provides real-time information to enhance situational awareness in appropriate contexts.

According to another aspect of the present disclosure, the symbology information that is encoded in metadata for each frame may include two or more different categories of metadata. In an illustrative embodiment, only appropriate categories of the symbology information are extracted and overlaid on the image data during post-processing. The appropriate categories may be determined based on the type of entity that is receiving and/or viewing the video data or may be selectable by a viewing entity for example. According to another aspect of the present disclosure, archived video data may be searched based on information encoded in the symbology metadata to locate particular attributes in a video stream for later viewing or analysis, for example.

According to an aspect of the present disclosure, a sensor data processing apparatus includes processing circuitry, a raw UHD video data input path coupled to the processing circuitry, and a number of image data output paths coupled in parallel to the processing circuitry. The sensor data processing apparatus also includes one or more metadata output paths coupled to the processing circuitry in parallel with the image data output paths, and a frame stitching module coupled to the image data output paths. According to an aspect of the present disclosure, the frame stitching module is configured to determine a first geographical position corresponding to an area represented by a first pixel of an edge or corner of a first frame of a video data stream, encode the first geographical position to generate geolocation metadata associated with the first pixel, and incorporate the geolocation metadata associated with the first pixel in a metadata space of the first frame.

According to an aspect of the present disclosure, the frame stitching module is also configured to determine a second geographical position corresponding to an area represented by a second pixel of an edge or corner of a second frame of the video data stream, to encode the second geographical position to generate geolocation metadata associated with the second pixel, and to incorporate the geolocation metadata associated with the second pixel in a metadata space of the second frame. The frame stitching module is configured to align the first frame with the second frame to generate an image including the first frame and the second frame.

In an illustrative embodiment, the frame stitching module is configured to compare the geolocation metadata associated with the first pixel and the geolocation information associated with the second pixel to determine a location of the first geographical position relative to the second geographical position, and to align the edge or corner of the first frame with the edge or corner of the second frame based on the location of the first geographical position relative to the second geographical position to generate an image including the first frame and the second frame. According to an aspect of the present disclosure, the frame stitching module is configured to align the first frame with the second frame in real time without resampling the first frame or the second frame.

Although aspects of the present disclosure are described in which certain metadata is included in each frame of a video stream, it should be understood that the disclosed systems and techniques may be implemented in alternative embodiments wherein some frames may not include particular metadata, or alternating frames may include particular metadata, for example.

Figure 12:
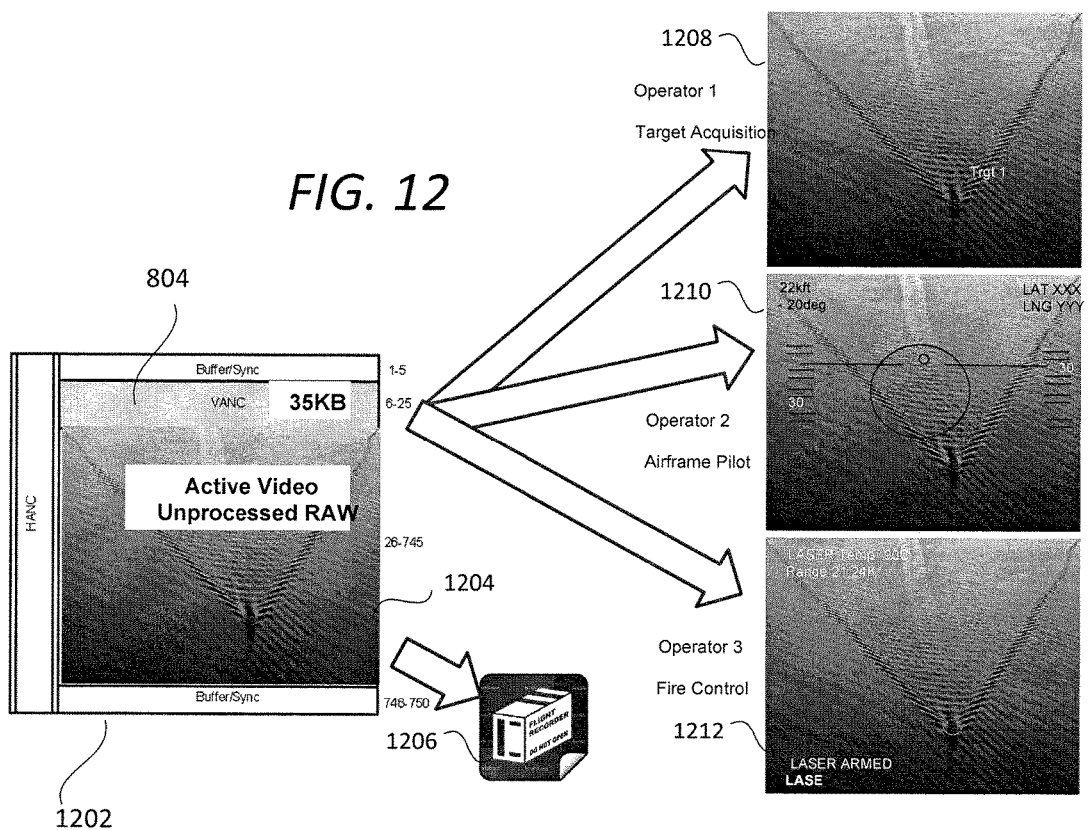
FIG. 12 is in illustration showing examples of symbology information that can be stored as metadata according to an aspect of the present disclosure.

FIG. 12 is an illustration showing examples of symbology information that can be stored as metadata of a UHD sensor data processing according to an aspect of the present disclosure. The symbology information can be included in VANC metadata space 804 as described above with reference to FIG. 8, for example. The symbology information in the VANC metadata space 804 is associated with an image frame 1202 which also includes unprocessed raw image data 1204. Examples of symbology information that can be located in the VANC metadata space 804 can include moving target track gates, heading, altitude, LOS, image statistics for contrast enhancement and video processing, and/or laser range and/or targeting arm and fire information.

According to an aspect of the present disclosure, raw image data can be exported to a storage device 1206, or may be combined in real time or near real time with different symbology information for viewing by different entities. In an illustrative embodiment, a first entity display 1208 may combine the raw image data with a first category of symbology, a second entity display 1210 may combine the raw image data with a second category of symbology, and a third entity display 1212 may combine the raw image data with a third category of symbology. In this embodiment, the three categories of symbology are all encoded in the VANC metadata space 804 of each corresponding image frame 1202.

Figure 13:
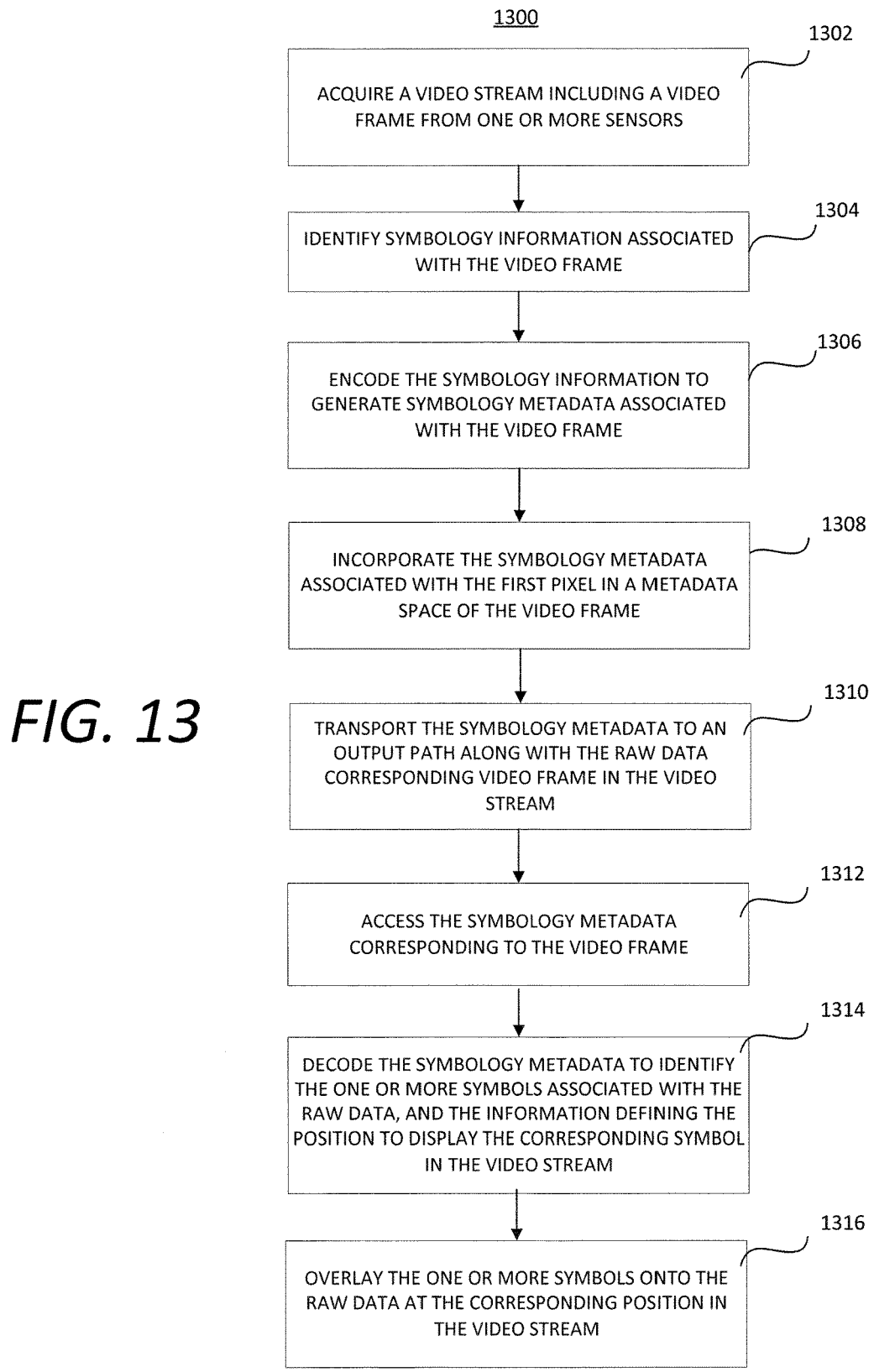
FIG. 13 is a process flow diagram showing a method of providing symbology in a video data stream according to an aspect of the present disclosure.

FIG. 13 is a process flow diagram showing a method 1300 of for providing symbology in a video data stream according to an aspect of the present disclosure. At block 1302, the method includes acquiring a video stream including a video frame from one or more sensors, such as image sensors 302, 306, 308. At block 1304, the method includes identifying symbology information associated with the video frame. At block 1306, the method includes encoding the symbology information to generate symbology metadata associated with the video frame. At block 1308, the method includes incorporating the symbology metadata associated with the first pixel in a metadata space of the video frame. The symbology metadata may be incorporated in a HANC metadata space or a VANC metadata space of the video frame, for example. The steps of identifying symbology information 1304, encoding the symbology information 1306 and incorporating the symbology metadata in a metadata space 1308 may be performed by the symbology module 1102 of FIG. 11, for example.

According to an aspect of the present disclosure, the video frame includes raw data received from the one or more sensors 302, 306, 308. According to another aspect of the present disclosure, the symbology information includes information defining one or more symbols associated with the raw data, and information defining a position to display the corresponding symbol in the video stream.

At block 1310, the method includes transporting the symbology metadata to an output path along with the raw data of the corresponding video frame in the video stream. The step of transporting the symbology metadata along with the raw data of the corresponding video frame 1310 may be performed by the symbology processing module 1102, of FIG. 11, for example. At block 1312, the method includes accessing the symbology metadata corresponding to the video frame. At block 1314, the method includes decoding the symbology metadata to identify the one or more symbols associated with the raw data, and the information defining the position to display the corresponding symbol in the video stream. At block 1316, the method includes overlaying the one or more symbols onto the raw data at the corresponding position in the video stream. The steps of accessing the symbology metadata 1314, decoding the symbology metadata 1314 and overlaying the symbols onto the raw data 1316 may be performed by the back end processor 316 of FIG. 3 or by a display apparatus receiving output from the back end processor 316, for example.

In an illustrative embodiment, the symbology information may include symbols in two or more different symbology categories. According to an aspect of the present disclosure, the method 1300 may also include overlaying only symbols that are in a selected one or more of the symbology categories. The selected symbology categories may be determined based on a type of consumer of the video data, or may be selectable by a viewing entity, for example.

While aspects of the present disclosure have been particularly shown and described with reference to the exemplary embodiments thereof, it will be understood by those of ordinary skill in the art that various changes in form and detail may be made therein without departing from the scope of the present disclosure as defined by the following claims.

The invention claimed is:

1. A method for providing symbology in a video data stream, comprising:
   acquiring a video stream including a video frame from one or more image sensors;
   identifying symbology information associated with the video frame;
   encoding the symbology information to generate symbology metadata associated with the video frame; and
   incorporating the symbology metadata in a metadata space of the video frame;
   wherein the video frame includes raw data received from the one or more image sensors, and
   wherein the symbology information includes information defining one or more symbols associated with the raw data, and information defining a position to display the corresponding symbol in the video stream.

2. The method of claim 1, further comprising incorporating the symbology metadata in a horizontal ancillary metadata space or a vertical ancillary metadata space of the video frame.

3. The method of claim 1, further comprising transporting the symbology metadata to an output path along with the raw data corresponding to the video frame in the video stream.

4. The method of claim 3, further comprising:
   accessing the symbology metadata corresponding to the video frame; and
   decoding the symbology metadata to identify one or more symbols associated with the raw data, and the information defining the position to display the one or more symbols in the video stream.

5. The method of claim 4, further comprising overlaying the one or more symbols onto the raw data at the corresponding position in the video stream.

6. The method of claim 1, wherein the symbology information includes symbols in two or more different symbology categories.

7. The method of claim 6 comprising, overlaying only symbols that are in a selected one or more of the symbology categories.

8. The method of claim 7, wherein the selected one or more of the symbology categories are determined based on a type of consumer of the video data.

9. The method of claim 7, wherein the selected one or more of the symbology categories are selectable by a viewing entity.

10. A sensor data processing apparatus, comprising:
    processing circuitry;
    a raw video data input path coupled to the processing circuitry;

a plurality of image data output paths coupled in parallel to the processing circuitry; and one or more metadata output paths coupled to the processing; and a symbology processing module coupled to the image data output, wherein the symbology processing module is configured to acquire a video stream including a video frame from one or more image sensors;

identify symbology information associated with the video frame;

encode the symbology information to generate symbology metadata associated with the video frame; and incorporate the symbology metadata associated with a metadata space of the video frame;

wherein the video frame includes raw data received from the one or more image sensors, and wherein the symbology information includes information defining one or more symbols associated with the raw data, and information defining a position to display the corresponding symbol in the video stream.

11. The apparatus of claim 10, wherein the symbology processing module is configured to incorporate the symbology metadata in a horizontal ancillary metadata space or a vertical ancillary metadata space of the video frame.

12. The apparatus of claim 10, wherein the symbology processing module is configured to transport the symbology metadata to an output path along with the raw data corresponding to the video frame in the video stream.

13. The apparatus of claim 12, wherein the symbology processing module is configured to:

access the symbology metadata corresponding to the video frame;

decode the symbology metadata to identify one or more symbols associated with the raw data, and the information defining a position to display the corresponding symbol in the video stream; and overlay the one or more symbols onto the raw data at the corresponding position in the video stream.

14. The apparatus of claim 12 wherein the symbology information includes symbols in two or more different symbology categories, and wherein the symbology processing module is configured to overlay only symbols that are in a selected one or more of the symbology categories.

15. The apparatus of claim 14, wherein the symbology processing module[s] is configured to determine the selected one or more of the symbology categories based on a type of consumer of the video data.

16. The apparatus of claim 14, wherein the selected one or more of the symbology categories are selectable by a consumer of the video data.

* * * * *